(12) United States Patent
Uchiyama

(10) Patent No.: US 6,963,318 B2
(45) Date of Patent: *Nov. 8, 2005

(54) IMAGE DISPLAY MEDIUM AND IMAGE DISPLAY APPARATUS

(75) Inventor: Koichi Uchiyama, Ibaraki-ken (JP)

(73) Assignee: Riso Kagaku Corporation, Tokyo (JP)

(*) Notice: Subject to any disclaimer, the term of this patent is extended or adjusted under 35 U.S.C. 154(b) by 512 days.

This patent is subject to a terminal disclaimer.

(21) Appl. No.: 10/218,627

(22) Filed: Aug. 15, 2002

(65) Prior Publication Data

US 2003/0043092 A1 Mar. 6, 2003

(30) Foreign Application Priority Data

Aug. 28, 2001 (JP) ............................ P2001-257999
Feb. 15, 2002 (JP) ............................ P2002-038278

(51) Int. Cl.$^7$ ............................................ G09G 3/00
(52) U.S. Cl. ...................................................... 345/30
(58) Field of Search ................... 345/30–107; 359/240, 359/248, 296; 349/92; 101/129, 114, 116–123, 101/128.4, 128.21

(56) References Cited

U.S. PATENT DOCUMENTS

| | | | | |
|---|---|---|---|---|
| 5,223,823 A | * | 6/1993 | Disanto et al. | 345/107 |
| 6,239,896 B1 | * | 5/2001 | Ikeda | 359/240 |
| 6,323,986 B1 | * | 11/2001 | Lee et al. | 359/248 |
| 6,679,167 B2 | * | 1/2004 | Uchiyama | 101/129 |
| 6,724,521 B2 | * | 4/2004 | Nakao et al. | 359/296 |
| 6,795,138 B2 | * | 9/2004 | Liang et al. | 349/92 |

* cited by examiner

Primary Examiner—Sumati Lefkowitz
Assistant Examiner—Srilakshmi K Kumar
(74) Attorney, Agent, or Firm—Nath & Associates PLLC; Gregory B. Kang; Derek Richmond

(57) ABSTRACT

An image display medium (1) has a structure, where a film body (2) having a number of fine film pieces (2a) provided corresponding to display pixels is held between a supporting member (3) and a covering member (4). The supporting member (3) is provided a number of movable spaces (5) provided to individually move the fine film pieces (2a) of the film body (2). Further, on the film body (2), selective switching is made between a state where each fine film piece (2a) is adsorbed and held on the covering member (4) to shut out a light, and a state where each fine film piece (2a) is adsorbed and held on a spacing wall (5a) of the supporting member (3) to transmit a light, so that an image is displayed.

7 Claims, 7 Drawing Sheets

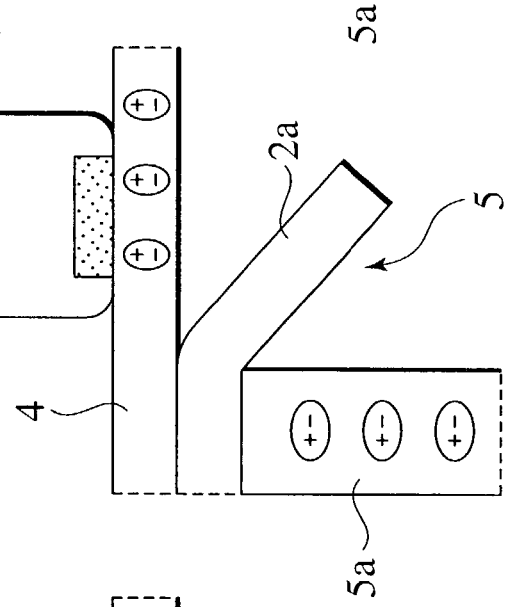
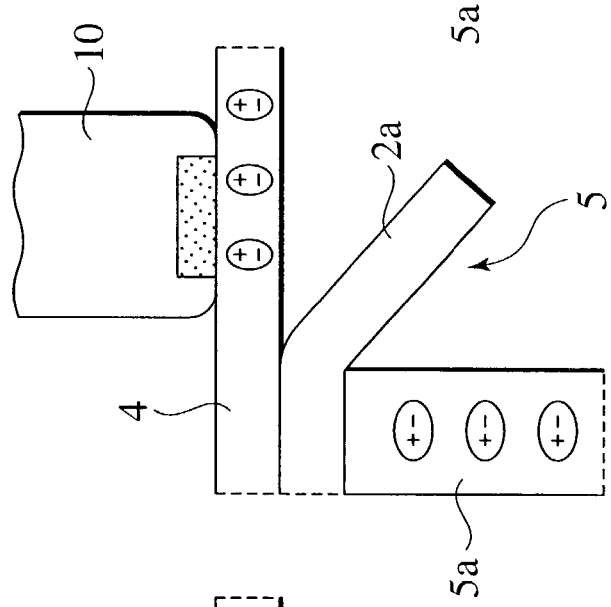
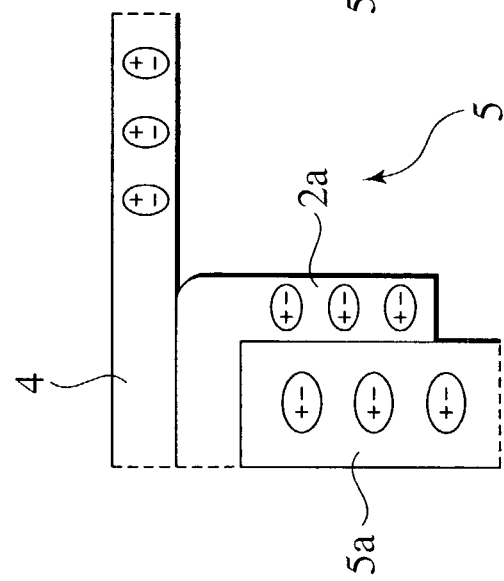

ary, the print sheet has been required to be able to

IMAGE DISPLAY MEDIUM AND IMAGE DISPLAY APPARATUS

BACKGROUND OF THE INVENTION

1. Field of the Invention

The present invention relates to an image display medium and an image apparatus for displaying image, and more particularly, this invention relates to a rewritable image display medium and an image display apparatus that is usable such as a paper.

2. Description of the Related Art

With progress of an information society in recent years, opportunities have been increased more and more to display computerized information as images on a display, and print out the images displayed on the display on print sheets in reading. In such a situation, the display has been required of high visibility of images similar to that of the images printed on the print sheets, easiness of carrying, and capability to use while being folded as is the case of the print sheets. On the contrary, the print sheet has been required to be able to rewrite repeatedly as display, and display even moving images.

To meet such requests, recently, novel media having both advantages of the display and the print sheet, so called electronic display and a paper-like-display have been presented, and technical developments have actively been pursued for their practical applications.

With regard to a technology for realizing the electronic paper or the paper-like-display, various technologies have been studied, for example a technology for displaying images by using a cataphoresis phenomenon, a technology for displaying images by using rotation of colored particles called twist balls, a technology for changing displayed images reversibly by a thermal rewritable type, a technology to which a liquid crystal display type is applied, and a technology for displaying images by moving colored powders in powder fine particles and so on.

However, in all of these technologies, a variety of problems still remain to be solved in terms of manufacturing costs, fast response, stability of displaying, and visibility. Accordingly, electronic paper or a paper-like-display inexpensive and capable of proper displaying has not been realized in the present state.

SUMMARY OF THE INVENTION

It is an object of the present invention to provide an image display medium and an image display apparatus, which have novel structures to be easily manufactured at low costs, to be capable of acquiring fast response, display stability and high visibility, and to display images properly.

The first aspect of the present invention provides an image display medium comprising: a film body formed by connecting a number of fine film pieces corresponding to display pixels by a base portion, the fine film pieces having light blocking effect; a supporting member having a number of movable spaces provided on one main surface portion, which allows the fine film pieces to move individually corresponding to a number of the fine film pieces of the film body, and designed to support the film body on the one main surface portion having a number of the movable spaces; and a covering member having a translucency, arranged on the one main surface portion of the supporting member through the film body, wherein for each fine film piece of the film body, switching is selectively made between a state where the fine film piece is adsorbed and held on the covering member by an electrostatic induction to shut out a light, and a state where the fine film piece is adsorbed and held on a spacing wall separating the movable spaces of the supporting member from one another by the electrostatic induction to transmit the light, so that an image is displayed.

The second aspect of the present invention provides the image display medium according to the first aspect of this invention, wherein the film body comprises an insulating film, a number of the fine film pieces being moved in a number of the movable spaces of the supporting member according to an external electric field, and being adsorbed and held on the covering member or the spacing wall of the supporting member.

The third aspect of the present invention provides the image display medium according to the first aspect of this invention, wherein the film body comprises a magnetic film, a number of the fine film pieces being moved in a number of the movable spaces of the supporting member according to an external magnetic field, and being adsorbed and held on the covering member or the spacing wall of the supporting member.

The fourth aspect of the present invention provides the image display medium according to the first aspect of this invention, wherein a thickness of a boundary portion between a number of the fine film pieces and the base portion is set thinner than that of other portions of the film body.

The fifth aspect of the present invention provides the image display medium according to the first aspect of this invention, wherein an antistatic finishing is provided on the covering member and the spacing wall of the supporting member.

The sixth aspect of the present invention provides the image display medium according to the first aspect of this invention, wherein each of the fine film pieces of the film body is divided into a plurality of element film pieces.

The seventh aspect of the present invention provides an image display apparatus comprising: an insulating film body formed by connecting a number of fine film pieces corresponding to display pixels by a base portion, the fine film pieces having light blocking effect; a supporting member comprising a number of movable spaces provided on one main surface portion, which allows the fine film pieces to move individually corresponding to a number of the fine film pieces of the insulating film body, and designed to support the insulating film body on the one main surface portion having a number of the movable spaces; a covering member having a translucency, arranged on the one main surface portion of the supporting member through the insulating film body; a transparent electrode provided on the covering member corresponding to the fine film pieces of the insulating film body; and an opposed electrode provided on other main surface portion of the supporting member, wherein a number of the fine film pieces of the insulating film body are moved in a number of the movable spaces of the supporting member according to an electric field generated between the transparent electrode and the opposed electrode, and wherein for each fine film piece of the insulating film body, switching is selectively made between a state where the fine film piece is adsorbed and held on the covering member by electrostatic induction to shut out a light, and a state where the fine film piece is adsorbed and held on a spacing wall separating the movable spaces of the supporting member from one another by electrostatic induction to transmit a light, so that an image is displayed.

BRIEF DESCRIPTION OF THE DRAWINGS

FIG. 2A is an explanatory view of an operation principle of the image display medium of the first embodiment, specifically showing a state where a fine film piece of a film body is adsorbed and held on a spacing wall of a supporting member;

FIG. 2B is an explanatory view of an operation principle of the image display medium of the first embodiment, specifically showing a state where the fine film piece of the film body is moving in a movable space of the supporting member;

FIG. 2C is an explanatory view of an operation principle of the image display medium of the first embodiment, specifically showing a state where the fine film piece of the film body is adsorbed and held on a covering member;

DETAILED DESCRIPTION OF THE PREFERRED EMBODIMENTS

Hereinafter, in order to describe the present invention more in detail, preferred embodiments of this invention will be explained with reference to the accompanying drawings below.

Figure 1A:
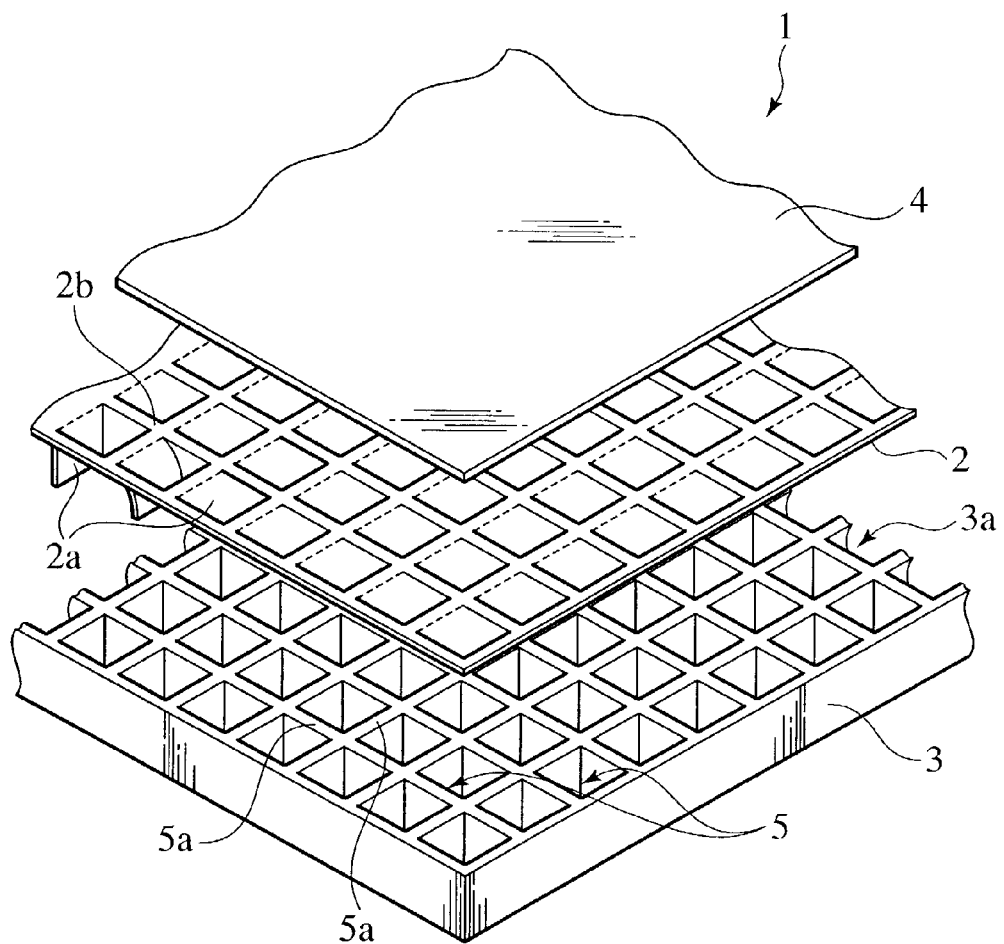
FIG. 1A is an exploded perspective view showing an enlarged part of an image display medium according to a first embodiment of the present invention.
Figure 1B:
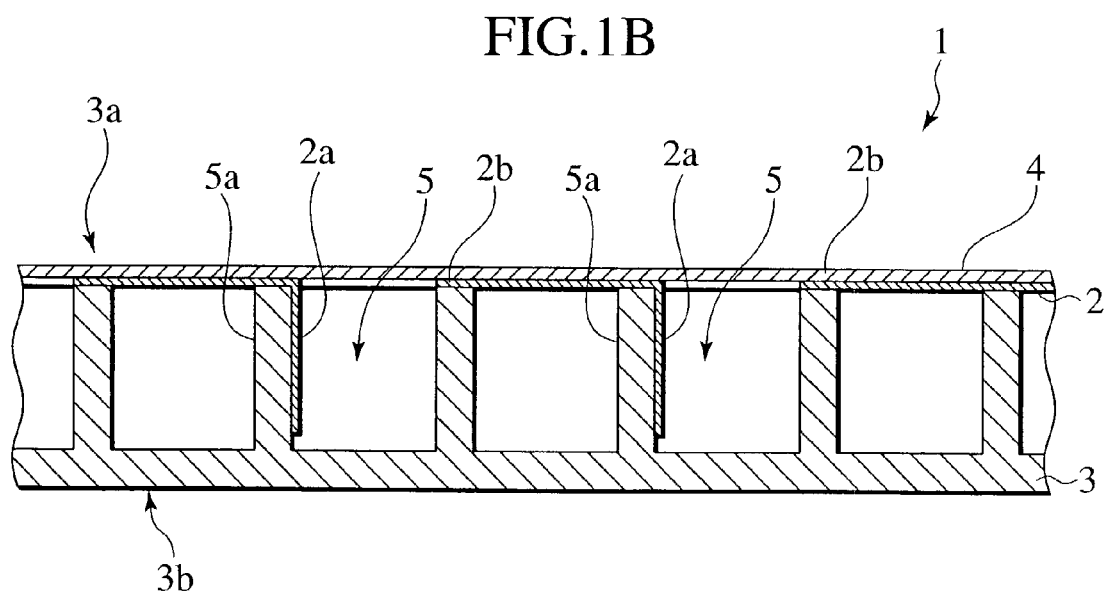
FIG. 1B is a sectional view showing an enlarged part of the image display medium of the first embodiment.

FIGS. 1A and 1B show an example of an image display medium 1 to which the present invention is applied. The image display medium 1 shown in FIGS. 1A and 1B is used as an electronic paper, and has a structure, where a film body 2 made of a magnetic film is held between a supporting member 3 and a covering member 4.

The film body 2 is formed by coating or depositing a magnetic material on a base body made of a resin such as polyethylene terephthalate (PET). For example, this can be applied to a commercially available magnetic tape for magnetic recording/reproducing. This film body 2 is formed in arbitrary size and shape corresponding to a display screen. Further, the film body 2 is provided a number of, for example U-shaped cuts at predetermined intervals on its full surface. Areas surrounded with the cuts are formed as a number of fine film pieces 2a having light blocking effect. An area between the fine film pieces 2a is formed as a base portion 2b of the film body 2.

Each fine film piece 2a of the film body 2 corresponds to a display element of the image display medium 1. A length of one side of the fine film piece 2a is, for example about 20 to 100 $\mu$m, and its shape is square. A size of the fine film piece 2a is properly decided in accordance with the intended use of the image display medium 1. For example, if the image display medium 1 is used assuming that it is seen from a far place as in the case of a large advertising display or the like, a size of the fine film piece 2a may be set equal to/higher than 100 $\mu$m. A shape of the fine film piece 2a is not limited to the square, and an arbitrary shape may be set considering molding easiness, visibility and the like. For example, the fine film piece 2a is formed by using a molding die having a fine blade corresponding to a cut shape to cut the film body 2, or by using a laser cutting device to cut the film body 2. Thus, manufacturing of the film body 2 is easily carried out by using a current high-precision processing technology.

In the film body 2 described above, a number of the fine film pieces 2a are rotatable with respect to the base portion 2b with a boundary portion between the base portion 2b and the fine film pieces 2a set as a fulcrum. Moreover, the base portion 2b of the film body 2 is abutted on one main surface portion 3a of the supporting member 3, whereby the film body 2 is supported by the supporting member 3.

A resin material such as PET is molded into a plate shape having a thickness for acquiring sufficient strength and proper flexibility as the image display medium 1, thus forming the supporting member 3. Further, on the one main surface portion 3a of the supporting member 3, a number of movable spaces 5 are provided, which allow each of the fine film piece 2a to move individually, corresponding to a number of the fine film pieces 2a of the film body 2.

On the one main surface portion 3a, movable spaces 5 having shapes corresponding to the fine film pieces 2a are respectively provided in positions directly below a number of the fine film pieces 2a when the film body 2 is supported by the supporting member 3. The base portion 2b of the film body 2 is abutted on an upper end surface of a spacing wall 5a for separating adjacent movable spaces 5 from each other, thereby supporting the film body 2 on the upper end surface of the spacing wall 5a. Thus, each fine film piece 2a is rotated with the boundary portion between the base portion 2b set as a fulcrum, and then each fine film piece 2a is moved in the movable space 5 of the supporting member 3. By the way, the molding die having fine projections, the shapes of which correspond a number of the movable spaces 5 is filled with a molten resin material, and then the molten resin material is solidified, whereby the supporting member 3 can be easily manufactured.

On the one main surface portion 3a having the movable space 5, the covering member 4 is arranged via the film body 2. For example, a resin material having translucency is used for the covering member 4, and the resin material is molded in a sheet form having a size and a shape corresponding to the film body 2 and the supporting member 3, thereby forming this covering member 4. In the image display medium 1 to which the present invention is applied, the film body 2 is held on the supporting member 3 so as to be sandwiched between the covering member 4 and the supporting member 3.

In the image display medium 1 thus constructed, the supporting member 3 and the covering member 4 are both eletrets. Therefore, electrostatic charges are generated on surfaces of the supporting member 3 and the covering member 4, respectively.

The supporting member 3 and the covering member 4 can be electret by, for example the following method. Namely, an external electric field is applied to the resin material while the resin material composing the supporting member 3 and the covering member 4 is in a molten state. By this external electric field, polarization is generated inside the resin material, and then the molten resin material is solidified. Hence, the state of the internal polarization generated in the solidified resin material is maintained, and then the electret supporting member 3 and the electret covering member 4 are manufactured.

The supporting member 3 and the covering member 4 are electret, thereby a number of the fine film pieces 2a sandwiched between the supporting member 3 and the covering member 4 are set to the state where electrostatic energy thereof in both positions of the spacing wall 5a side separating the movable spaces 5 from each other and the covering portion 4 is small (i.e., bi-stable multivibrator). Further, in the image display medium 1 to which the present invention is applied, switching is made selectively for each fine film piece 2a between a state where each fine film piece 2a is adsorbed and held on the covering member 4 to shut out a light, and a state where each fine film piece 2a is adsorbed and held on the spacing wall 5a of the supporting member 3 to transmit the light. Accordingly, an image is displayed.

Specifically, a resin base body of the film body 2 is an electrical insulator (i.e., dielectric). As shown in FIG. 2A, while each fine film piece 2a of the film body 2 is in contact with the spacing wall 5a of the supporting member 3, polarization is generated by electrostatic induction caused by electrostatic charges of the spacing wall 5a, and Coulomb's force is applied to adsorb and hold the fine film piece 2a on the spacing wall 5a. While the fine film piece 2a is adsorbed and held on the spacing wall 5a, a light incident on the image display medium 1 is not shut out by the fine film piece 2a having light blocking effect through the covering member 4, but transmitted through the film body 2. Thus, a display pixel corresponding to the fine film piece 2a is displayed as a bright point. As shown in FIG. 2B, when an external magnetic field for generating a force exceeding holding power by electrostatic induction is applied from the covering member 4 side by a write head 10, the fine film piece 2a is peeled off from the spacing wall 5a by the external magnetic field from the write head 10, and moved in the movable space 5. At this time, the fine film piece 2a moved in the movable space 5 is separated from the spacing wall 5a, whereby the fine film piece 2a becomes electrically neutral.

By the external magnetic field from the write head 10, the fine film piece 2a is moved in the movable space 5, and brought close to the covering member 4. Then, the fine film piece 2a generates polarization by electrostatic induction caused by electrostatic charges of the covering member 4. As a result, the fine film piece 2a is adsorbed and held on the covering member 4 as shown in FIG. 2C. While the fine film piece 2a is adsorbed and held on the covering member 4, a light incident on the image display medium 1 through the covering member 4 is shut out by the fine film piece 2a having light blocking effect. Therefore, a display pixel corresponding to the fine film piece 2a is displayed as a dark point.

Figure 3A:
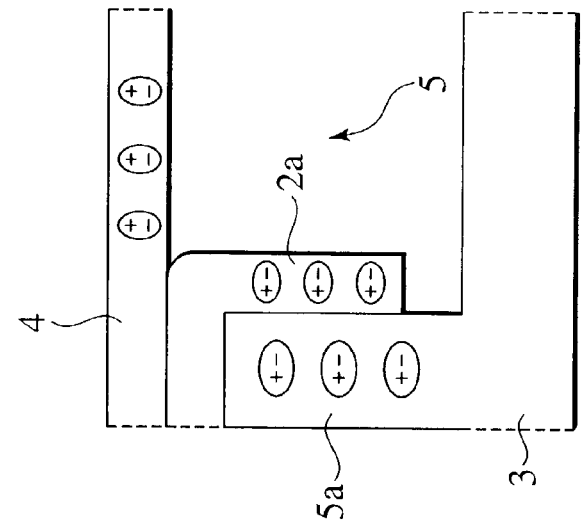
FIG. 3A is an explanatory view of an operation principle of the image display medium of the first embodiment, specifically showing a state where the fine film piece of the film body is adsorbed and held on the covering member.
Figure 3B:
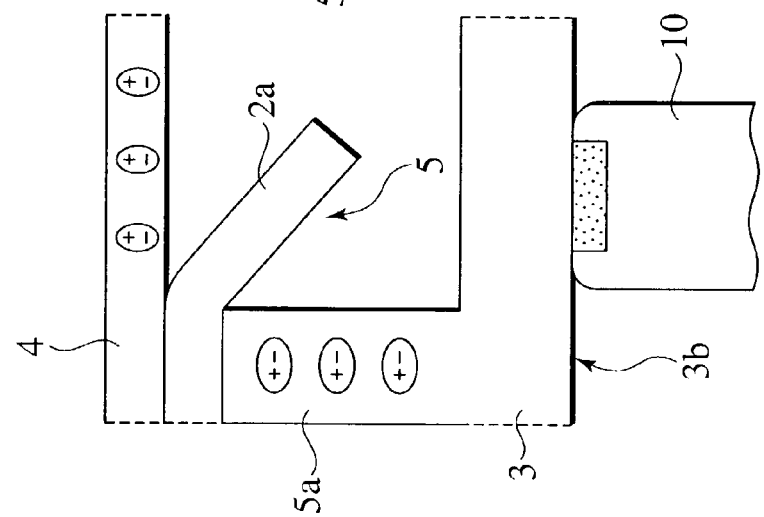
FIG. 3B is an explanatory view of an operation principle of the image display medium of the first embodiment, specifically showing a state where the fine film piece of the film body is moving in the movable space of the supporting member.
Figure 3C:
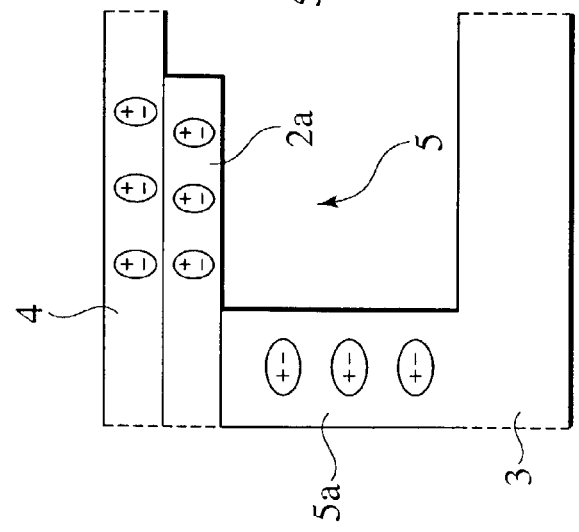
FIG. 3C is an explanatory view of an operation principle of the image display medium of the first embodiment, specifically showing a state where the fine film piece of the film body is adsorbed and held on the spacing wall of the supporting member.

As shown in FIG. 3A, the fine film piece 2a is adsorbed and held on the covering member 4, and the light incident on the image display medium 1 through the covering member 4 is shut out by the fine film piece 2a. As shown in FIG. 3B, when an external magnetic field for generating a force exceeding holding power by electrostatic induction is applied from the other main surface portion 3b side by the write head 10, the fine film piece 2a is peeled off from the covering member 4 by the external magnetic field from the write head 10. Then, the fine film piece 2a is moved in the movable space 5. When the fine film piece 2a is brought close to the spacing wall 5a by the external magnetic field from the write head 10, the fine film piece 2a is adsorbed and held on the spacing wall 5a (see FIG. 3C). Accordingly, the light incident on the image display medium 1 through the covering member 4 is not shut out by the fine film piece 2a, but transmitted through the film body 2.

As described above, in the image display medium 1 to which the present invention is applied, switching is made selectively for each fine film piece 2a between the state where the fine film piece 2a is adsorbed and held on the covering member 4 to shut out a light, and the state where the fine film piece 2a is adsorbed and held on the spacing wall 5a of the supporting member 3 to transmit a light according to the external magnetic field. Therefore, the image display medium 1 to which the present invention is applied, brightness of a display pixel corresponding to each fine film piece 2a is controlled, whereby a desired image can be displayed clearly.

When no external magnetic fields are applied thereto, the state of each fine film piece 2a being adsorbed and held on the covering member 4 or the spacing wall 5a is maintained, so that in the image display medium 1, the state of displaying a desired image can be stably maintained. Moreover, an external magnetic field is applied to the image display medium 1 by using the write head 10, thereby allowing each fine film piece 2a to be switched between the state of shutting out a light and the state of transmitting a light. Accordingly, rewriting of a displayed image can be performed repeatedly. Further, such rewriting of the displayed image is realized by a movement of the fine film piece 2a, thereby allowing the displayed image to be rewritten very quickly with high response.

The image display medium 1 is constructed by using a member, such as a magnetic film or a resin molded article, a manufacturing technology thereof having been established. Moreover, since the member can be manufactured by an existing high-precision processing technology, the image display medium 1 can be manufactured at low costs and the like.

In the image display medium 1 to which the present invention is applied, each fine film piece 2a of the film body 2 is moved in the movable space 5 of the supporting member 3, and then the fine film piece is adsorbed and held on the covering member 4 or the spacing wall 5a of the supporting member 3. Therefore, because of a repeated movement of each fine film piece 2a, though rarely, separation charges may be occurred on the covering member 4 or the spacing wall 5a of the supporting member 3. When such separation charges are generated on the covering member 4 or the spacing wall 5a of the supporting member 3, behavior of the fine film piece 2a of the portion becomes unstable, whereby it is assumed that the fine film piece 2a may not be properly moved according to the external magnetic field.

Thus, preferably, by providing antistatic finishing on the covering member 4 and the spacing wall 5a of the supporting member 3, an effect of the foregoing separation charges is prevented. Accordingly, in the image display medium 1 of the invention, even when rewriting of the displayed image is repeated, the effect of separation charges attributed to the movement of the fine film piece 2a is effectively prevented, such that a proper image can always be displayed according to the external magnetic field.

In the image display medium 1, as described above, each fine film piece 2a of the film body 2 is moved in the movable space 5 with the boundary portion between the base portion 2b set as a fulcrum. Thus, in order to improve response of each fine film piece 2a to the external magnetic field more, it is preferable that a thickness of the boundary portion between each fine film piece 2a and the base portion 2b is set thinner compared with those of the other portions. Namely, to provide the film body 2 with rigidity to endure repeated use, it is necessary to secure a certain thickness of the film body 2. However, when the film body 2 becomes thick, good bending performance cannot be obtained on the boundary portion between the fine film piece 2a and the base portion 2b, whereby a reduction may occur in the response of the fine film piece 2a to the external magnetic field.

Figure 4:
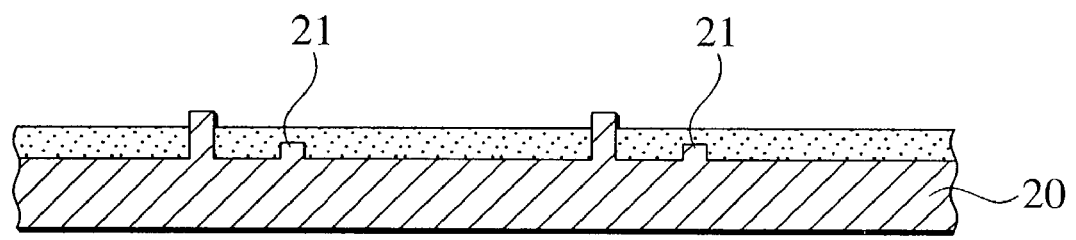
FIG. 4 is a sectional view schematically showing a state where a film body having a thickness of a boundary portion between each fine film piece and a base portion set thinner than those of other portions is molded.

In such a case, preferably, a thickness of the boundary portion between each fine film piece 2a and the base portion 2b is set thinner than those of the other portions, and certain rigidity is provided to the film body 2, thereby obtaining good bending performance on the boundary portion between each fine film portion 2a and the base portion 2b. Note that as a method of setting the thickness of the boundary portion between each fine film portion 2a and the base portion 2b thinner compared with those of the other portions, after the molding of the film body 2, a concave portion may be formed on the boundary portion between each fine film piece 2a and the base portion 2b by cutting process to set the thickness of this portion thin. As shown in FIG. 4, in a position of the boundary portion between each fine film piece 2a and the base portion 2b, a molding jig 20 having a projection 21 lower than the thickness of the film body 2 is used, and this molding jig 20 is filled with a molten resin material. Further, the molten resin material is solidified. Therefore, the film body 2 having the thickness of the boundary portion between each fine film piece 2a and the base portion 2b set thinner compared with those of the other portions may be molded. In this case, execution of cutting process or the like is not necessary after the molding of the film body 2, so that the number of processes can be reduced to further lower manufacturing costs.

One example of the image display medium 1 to which the present invention is applied has been described above concretely. However, the present invention is not limited to the foregoing example, and various changes are possible. Concretely, for example, in the image display medium 1, the supporting member 3 and the covering member 4 are electret, thereby adsorbing and holding each fine film piece 2a on the spacing wall 5a or the covering member 4. However, in place of the supporting member 3 and the covering member 4, the film body 2 is electret, accordingly each fine film piece 2a can be similarly adsorbed and held on the spacing wall 5a or the covering member 4, so that an advantage similar to that of the foregoing image display medium 1 can be obtained.

In the image display medium 1, the spacing wall 5a of the supporting member 3 is erected roughly perpendicularly to the covering member 4. However, as shown in FIG. 5B, a structure may be made, where the spacing wall 5a of the supporting member 3 has an inclined plane inclined by a predetermined angle with respect to the covering member 4, and each fine film piece 2a of the film body 2 is adsorbed and held on this inclined plane. Also in this case, shut-out and transmission of the lights are switched between when the fine film piece 2a is adsorbed and held on the covering member 4 and when the fine film 2 is adsorbed and held on the slope of the spacing wall 5a of the supporting member 3. Accordingly, an advantage similar to that of the foregoing image display medium 1 can be obtained.

Moreover, in the image display medium 1, an area surrounded with an U-shaped cut provided on the film body 2 is set as the fine film piece 2a having translucency respectively. Each fine film piece 2a is constructed as an integral film piece corresponding to an opening shape of each movable space 5 of the supporting member 3. However, as shown in FIG. 5A and FIG. 6, each fine film piece 2a may be divided into a plurality of element film pieces 22, and constructed as a set of the plurality of element film pieces 22.

Figure 5A:
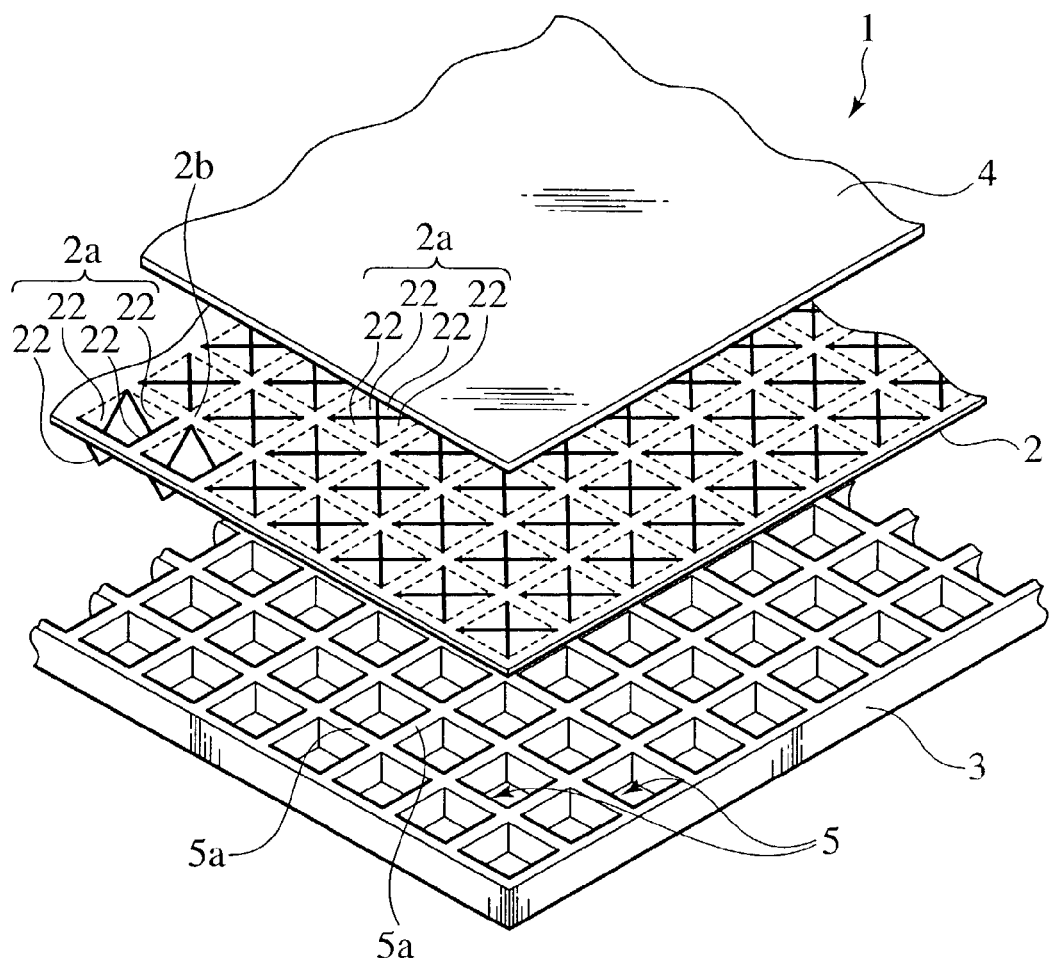
FIG. 5A is an exploded perspective view showing an enlarged part of an image display medium according to a second embodiment of the present invention.
Figure 5B:
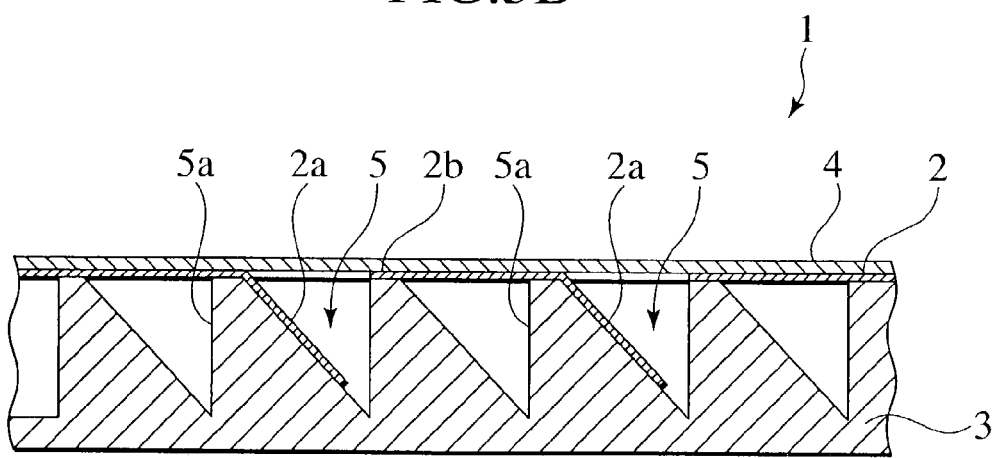
FIG. 5B is a sectional view showing an enlarged part of the image display medium of the second embodiment.

To take a specific example, as shown in FIG. 5A, a number of X-shaped cuts are provided at predetermined intervals on a full surface of the film body 2. A triangular area surrounded by each of these cuts, and the edge of the movable space 5 of the supporting member 3 is set as an element film piece 22 respectively. Further, one fine film piece 2a is composed of four element film pieces 22 corresponding to each movable space 5.

In the image display medium 1 thus constructed, the four element film pieces 22 composing one fine film piece 2a are associatively moved in one movable space 5 according to an external magnetic field, and then adsorbed and held on the covering member 4 or the spacing wall 5 of the supporting member 3. Therefore, for each display pixel, switching is selectively made between a state of shutting out a light and a state of transmitting a light according to the external magnetic field, whereby a desired image is displayed on the image display medium 1.

Figure 6:
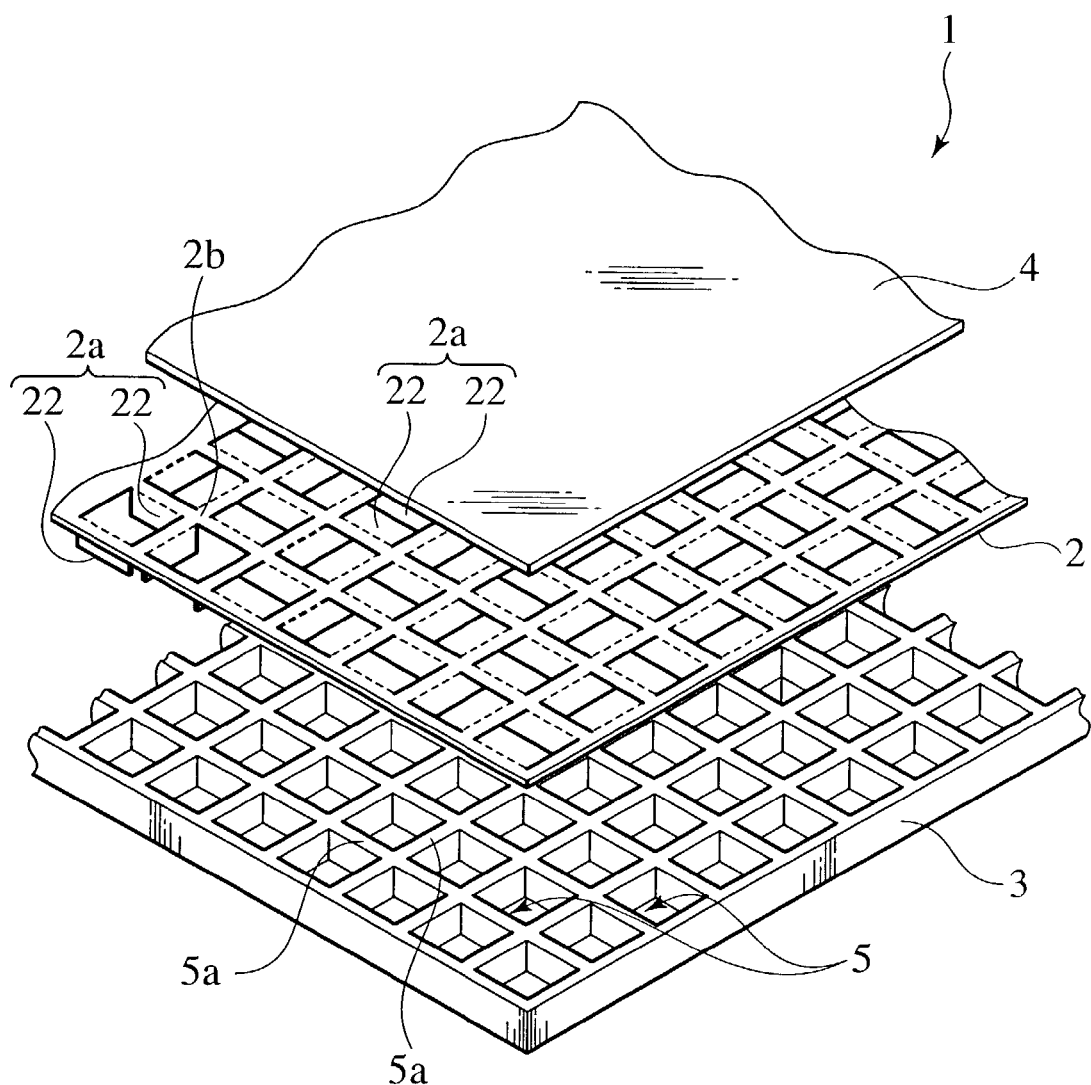
FIG. 6 is an exploded perspective view showing an enlarged part of an image display medium according to a third embodiment of the present invention.

In an example shown in FIG. 6, a number of H-shaped cuts are provided at predetermined intervals on a full surface of the film body 2. A rectangular area surrounded by each of these cuts and an edge of the movable space 5 is set as an element film piece 22. Moreover, one fine film piece 2a is composed of two element film pieces 22 corresponding to each movable space 5.

In the image display medium 1 thus constructed, the two element film pieces 22 composing one fine film piece 2a are associatively moved in one movable space 5 according to an external magnetic field, and then adsorbed and held on the covering member 4 or the spacing wall 5a of the supporting member 3. Therefore, for each display pixel, switching is selectively made between a state of shutting out a light and a state of transmitting a light, whereby a desired image is displayed on the image display medium 1.

As described above, in the structure where each fine film piece 2a corresponding to the display pixel is divided into the plurality of element film pieces 22, and one fine film piece 2a is formed as a set of the plurality of element film pieces 22, a depth dimension of the movable space 5 of the supporting member 3 can be set short, so that by setting a thickness of the supporting member 3 thin, the entire image display medium 1 can be made thin.

The method of dividing each fine film piece 2a into the plurality of element film pieces 22, and the shapes of the element film pieces 22, and the like are not limited to those of the examples shown in FIG. 5A and FIG. 6. Various modes are conceivable. For example, cuts may be formed at random for each fine film piece 2a, and each fine film piece 2a may be divided into a plurality of element film pieces 22 having irregular shapes. However, as shown in FIG. 5A and FIG. 6, when each fine film piece 2a is divided into a plurality of element film pieces 22 by a parting line passed through the opening center position of the movable space 5 corresponding to this fine film piece 2a, a depth dimension of the movable space 5 of the supporting member 3 can be set to ½ of that of the example shown in FIG. 1A, whereby then entire image display medium 1 can be made thin most effectively.

In the image display medium 1, a magnetic film such as a magnetic tape is used for the film body 2 and, by applying an external magnetic field, each fine film piece 2a of the film body 2 is moved according to the external magnetic field to display a desired image. However, by using an insulating film for the film body 2, and applying an external electric field, each fine film piece 2a may be moved according to the external electric field, thereby displaying a desired image.

Figure 7:
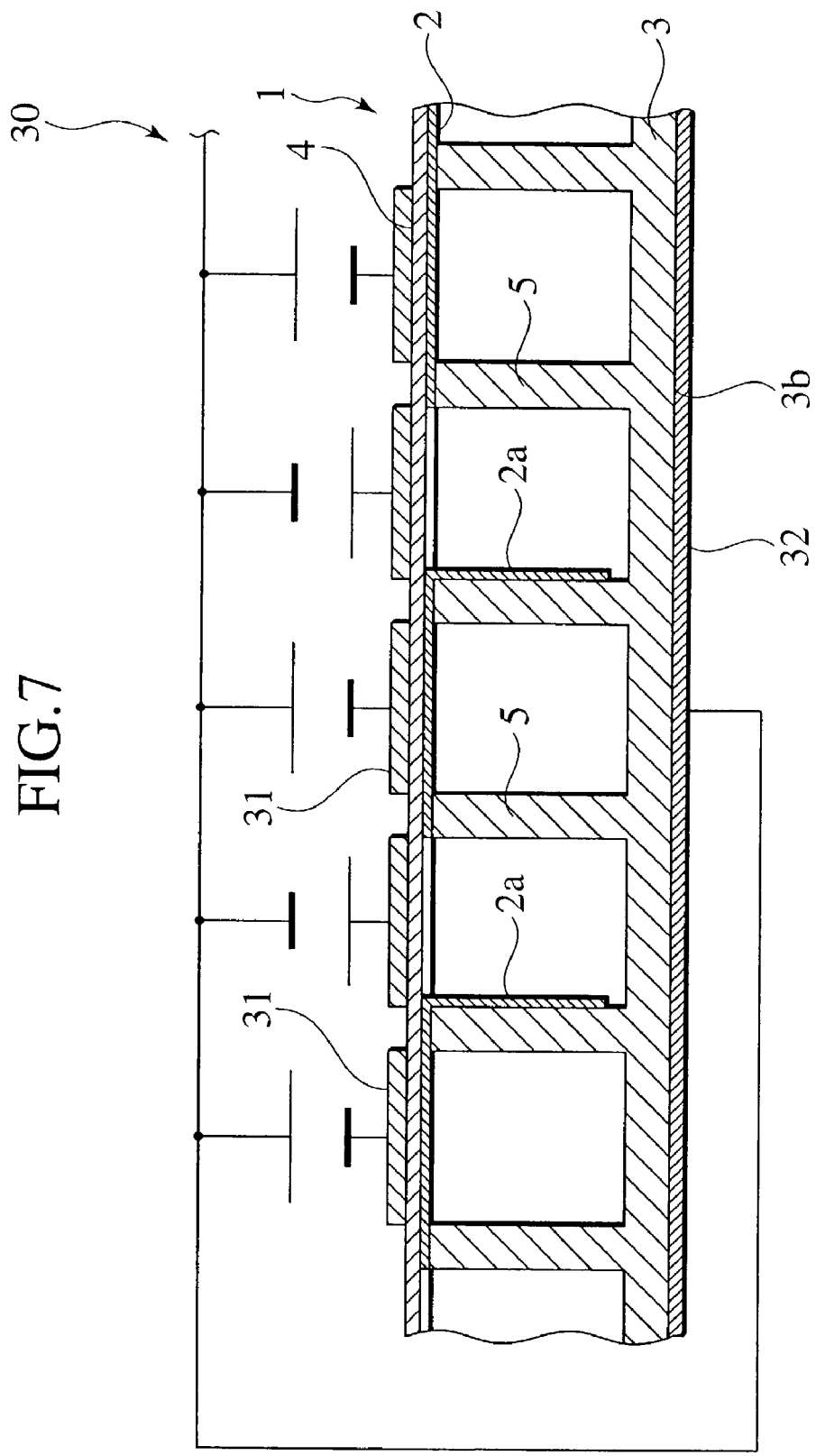
FIG. 7 is a sectional view schematically showing an image display apparatus including the image display media of the first to third embodiments.

In a structure where each fine film piece 2a is moved according to an electric field to display a desired image, as schematically shown in FIG. 7, a transparent electrode 31 is formed on the covering member 4 corresponding to each fine film piece 2a of the film body 2. Further, by forming an opposed electrode 32 on the other main surface portion 3b of the supporting member 3, an image display apparatus 30 can be constructed, which is used as a paper-like-display.

Namely, the image display apparatus 30 is integrally formed by providing the foregoing display medium 1 with both the transparent electrode 31 and the opposed electrode 32. Electric field is applied on the display medium 1 by these electrodes 31 and 32. A desired electric field is generated between the transparent electrode 31 and the opposed electrode 32, whereby each fine film piece 2a of the film body 2 is moved according to this electric field to display an image.

In the image display apparatus 30, as is the case of the foregoing image display medium 1, a clear image can be displayed stably with good response. In addition, a displayed image can be rewritten as occasion arises. Therefore, for example a moving image and the like can be displayed.

In the image display medium and the image display apparatus of the present invention, each fine film piece provided in the film body held between the supporting member and the covering member is adsorbed and held on the covering member or the spacing wall of the supporting member by electrostatic induction and, by controlling light shutting-out or transmitting by each fine film piece for each, an image is displayed. Therefore, a clear image can be displayed stably with good response. Further, since proper manufacturing can be carried out by the existing high-precision processing technology, it is possible to realize low costs.

The present disclosure relates to subject matters contained in Japanese Patent Application No. 2002-038278, filed on Feb. 15, 2002, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. An image display medium comprising:
   a film body formed by connecting a number of fine film pieces corresponding to display pixels by a base portion, the fine film pieces having light blocking effect;
   a supporting member having a number of movable spaces provided on one main surface portion, which allows the fine film pieces to move individually corresponding to a number of the fine film pieces of the film body, and designed to support the film body on the one main surface portion having a number of the movable spaces; and
   a covering member having a translucency, arranged on the one main surface portion of the supporting member through the film body,
   wherein for each fine film piece of the film body, switching is selectively made between a state where the fine film piece is adsorbed and held on the covering member by an electrostatic induction to shut out a light, and a state where the fine film piece is adsorbed and held on a spacing wall separating the movable spaces of the supporting member from one another by the electrostatic induction to transmit the light, so that an image is displayed.

2. The image display medium according to claim 1, wherein the film body comprises an insulating film, a number of the fine film pieces being moved in a number of the movable spaces of the supporting member according to an external electric field, and being adsorbed and held on the covering member or the spacing wall of the supporting member.

3. The image display medium according to claim 1, wherein the film body comprises a magnetic film, a number of the fine film pieces being moved in a number of the movable spaces of the supporting member according to an external magnetic field, and being adsorbed and held on the covering member or the spacing wall of the supporting member.

4. The image display medium according to claim 1, wherein a thickness of a boundary portion between a number of the fine film pieces and the base portion is set thinner than that of other portions of the film body.

5. The image display medium according to claim 1, wherein an antistatic finishing is provided on the covering member and the spacing wall of the supporting member.

6. The image display medium according to claim 1, wherein each of the fine film pieces of the film body is divided into a plurality of element film pieces.

7. An image display apparatus comprising:
   an insulating film body formed by connecting a number of fine film pieces corresponding to display pixels by a base portion, the fine film pieces having light blocking effect;
   a supporting member comprising a number of movable spaces provided on one main surface portion, which allows the fine film pieces to move individually corresponding to a number of the fine film pieces of the insulating film body, and designed to support the insulating film body on the one main surface portion having a number of the movable spaces;

a covering member having a translucency, arranged on the one main surface portion of the supporting member through the insulating film body;

a transparent electrode provided on the covering member corresponding to the fine film pieces of the insulating film body; and an opposed electrode provided on other main surface portion of the supporting member, wherein a number of the fine film pieces of the insulating film body are moved in a number of the movable spaces of the supporting member according to an electric field generated between the transparent electrode and the opposed electrode, and wherein for each fine film piece of the insulating film body, switching is selectively made between a state where the fine film piece is adsorbed and held on the covering member by electrostatic induction to shut out a light, and a state where the fine film piece is adsorbed and held on a spacing wall separating the movable spaces of the supporting member from one another by electrostatic induction to transmit a light, so that an image is displayed.

* * * * *